US 7,685,213 B2

United States Patent
Reynolds

(10) Patent No.: US 7,685,213 B2
(45) Date of Patent: Mar. 23, 2010

(54) CONVERSION OF FLOATING-POINT NUMBERS FROM BINARY INTO STRING FORMAT

(75) Inventor: Nathan Luther Reynolds, Mesa, AZ (US)

(73) Assignee: Siebel Systems, Inc., San Mateo, CA (US)

(*) Notice: Subject to any disclaimer, the term of this patent is extended or adjusted under 35 U.S.C. 154(b) by 986 days.

(21) Appl. No.: 11/103,996

(22) Filed: Apr. 12, 2005

(65) Prior Publication Data

US 2007/0203965 A1    Aug. 30, 2007

Related U.S. Application Data

(60) Provisional application No. 60/667,192, filed on Mar. 31, 2005.

(51) Int. Cl.
*G06F 5/00* (2006.01)
(52) U.S. Cl. .................................................... 708/204
(58) Field of Classification Search .................. 708/204
See application file for complete search history.

(56) References Cited

U.S. PATENT DOCUMENTS

| | | | | |
|---|---|---|---|---|
| 5,572,207 A | * | 11/1996 | Harding et al. | 341/62 |
| 6,148,316 A | * | 11/2000 | Herbert et al. | 708/505 |
| 6,535,898 B1 | * | 3/2003 | Yuval | 708/204 |
| 7,216,138 B2 | * | 5/2007 | Abdallah et al. | 708/204 |
| 2007/0220076 A1 | * | 9/2007 | Hinds | 708/204 |

OTHER PUBLICATIONS

Burger, Robert G. and Dybvig, R. Kent, *Printing Floating-Point Numbers Quickly and Accurately*, Indiana University Computer Science Department, Lindley Hall 215, Bloomington, Indiana, *Proceedings of the SIGPLAN '96 Conference on Programming Language Design and Implementation*, pp. 108-116, May 1996.

* cited by examiner

*Primary Examiner*—David H Malzahn
(74) *Attorney, Agent, or Firm*—Campbell Stephenson LLP

(57) ABSTRACT

A method, system, and computer program product that convert a real number from a floating point representation to a character string. Mantissa bits are extracted from the floating-point representation of a value into an integer format. The mantissa bits of the integer format may be shifted left by a number of positions that is equal to a base 2 exponent of a first representation of the value. Prior to converting the value, the floating-point representation of the value can be divided by $2^n$, where n is the number of the mantissa bits in the floating-point representation of the value. A set of operations can then be performed to convert a result of the division to a number greater than or equal to 1.0 and less than 10.0. The set of operations may include multiplication operations and/or retrieving a constant from a lookup table.

14 Claims, 15 Drawing Sheets

| Step | Base 10 Variable | Base 10 Number | | Base 2 Number | |
|---|---|---|---|---|---|
| | | Mantissa | Exponent | Mantissa | Exponent |
| 410 | 0 | 6.225 | 1 | 1.1111001000000000000000000000000000000000000000000 | 5 |
| 420 | 0 | 1.3822276656... | -14 | 1.1111001000000000000000000000000000000000000000000 | -47 |
| 440 = 522, 524 (i=3) | -8 | 1.3822276656... | -6 | 1.0111001100001001111011000111111111111111111010001 | -20 |
| 440 = 522, 524 (i=2) | -12 | 1.3822276656... | -2 | 1.1100010011101101101010010001100100011111111111000111 | -7 |
| 440 = 522, 524 (i=1) | -14 | 1.3822276656... | 0 | 1.0110000111011001101011000001101110100001000000000000 | 0 |

| Step | Base 10 Variable | 64-bit Integer | String |
|---|---|---|---|
| 450 | -14 | 1011000011101100110101100000110111010000100000000000 | - |
| 460 | -14 | 1011000011101100110101100000110111010000100000000000 | - |
| 470 | -14 | 1011000011101100110101100000110111010000100000000000 | ?6225000000000000 |
| 480 | 1 | 1011000011101100110101100000110111010000100000000000 | ?6225000000000000 |
| 490 | 1 | 1011000011101100110101100000110111010000100000000000 | ?6225 |
| 240 | 1 | 1011000011101100110101100000110111010000100000000000 | 6?225 |
| 240 | 1 | 1011000011101100110101100000110111010000100000000000 | 6.225 |
| 250 | 1 | 1011000011101100110101100000110111010000100000000000 | 6.225e |
| 250 | 1 | 1011000011101100110101100000110111010000100000000000 | 6.225e1 |

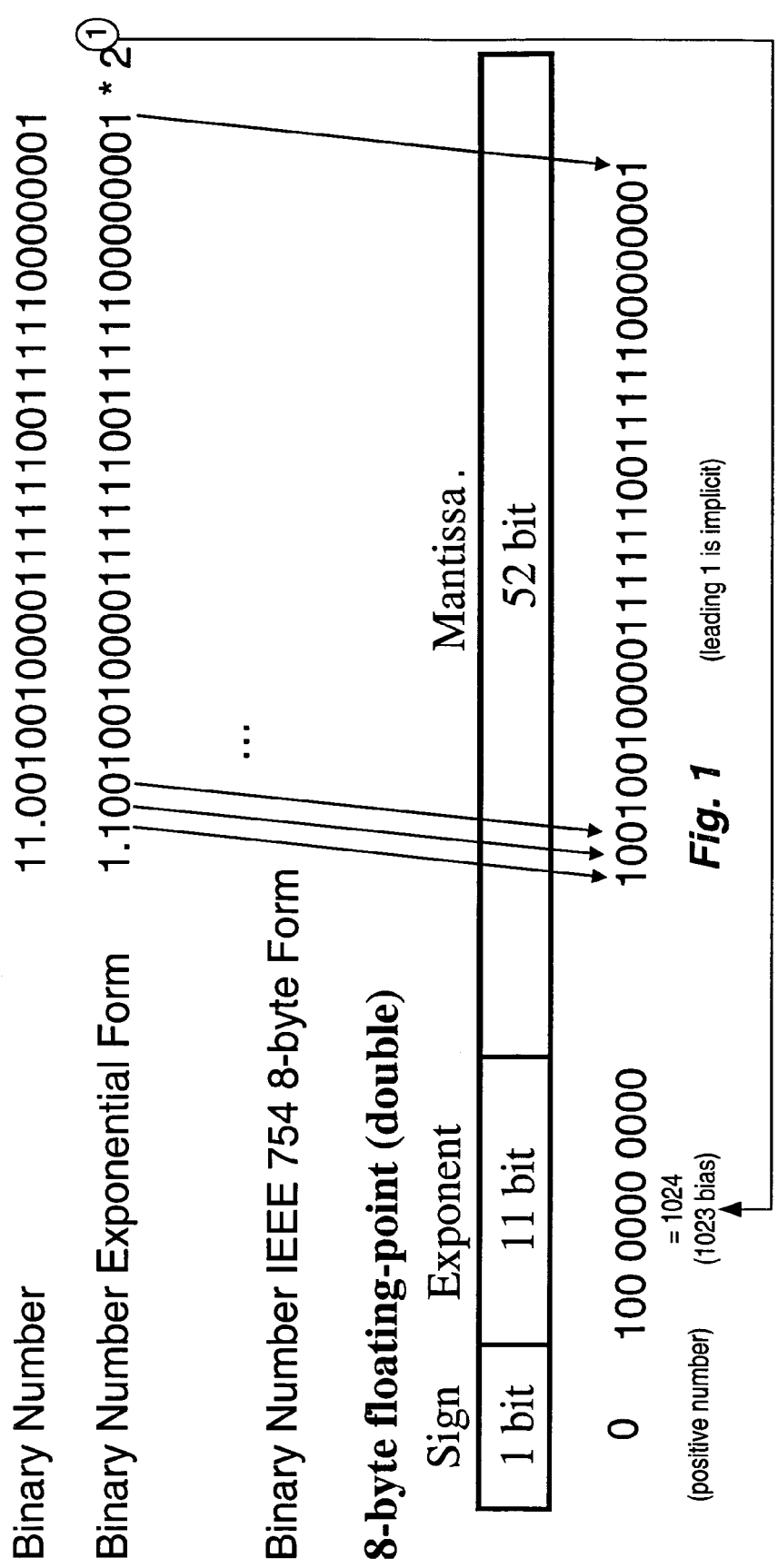

| Loop Iteration | FIGURE 2B reference | Current Representation of Real Number | Character String | Comment |
|---|---|---|---|---|
| | | 3.14159 | | |
| | 232 | 3.14159 | | no change |
| 1 | 234 | 3.14159 | 3 | |
| | 238 | .14159 | 3 | |
| | 239 | 1.4159 | 3 | multiplication by 10 |
| 2 | 234 | 1.4159 | 31 | |
| | 238 | .4159 | 31 | |
| | 239 | 4.159 | 31 | multiplication by 10 |
| 3 | 234 | 4.159 | 314 | |
| | 238 | .159 | 314 | |
| | 239 | 1.59 | 314 | multiplication by 10 |
| 4 | 234 | 1.59 | 3141 | |
| | 238 | .59 | 3141 | |
| | 239 | 5.9 | 3141 | multiplication by 10 |
| 5 | 234 | 5.9 | 31415 | |
| | 238 | .9 | 31415 | |
| | 239 | 9 | 31415 | multiplication by 10 |
| 6 | 234 | 9 | 314159 | |
| | 238 | | 314159 | |

*Fig. 3*

| Step | Base 10 Variable | Base 10 Number Mantissa | Base 10 Number Exponent | Base 2 Number Mantissa | Base 2 Number Exponent |
|---|---|---|---|---|---|
| 410 | 0 | 6.225 | 1 | 1.1111001000000000000000000000000000000000000000000000 | 5 |
| 420 | 0 | 1.3822276656... | -14 | 1.1111001000000000000000000000000000000000000000000000 | -47 |
| 440 = 522, 524 (i=3) | -8 | 1.3822276656... | -6 | 1.0111001100010011110100011111111111010001 | -20 |
| 440 = 522, 524 (i=2) | -12 | 1.3822276656... | -2 | 1.1100010011101101010010001001111111000111 | -7 |
| 440 = 522, 524 (i=1) | -14 | 1.3822276656... | 0 | 1.0110000111011001101011000010000000000000 | 0 |

| Step | Base 10 Variable | 64-bit Integer | String |
|---|---|---|---|
| 450 | -14 | 1011000011101100110101101011010101101011101000010000000000000000 | - |
| 460 | -14 | 1011000011101100110101101011010101101011101000010000000000000000 | - |
| 470 | -14 | 1011000011101100110101101011010101101011101000010000000000000000 | ?6225000000000000 |
| 480 | 1 | 1011000011101100110101101011010101101011101000010000000000000000 | ?6225000000000000 |
| 490 | 1 | 1011000011101100110101101011010101101011101000010000000000000000 | 6?225 |
| 240 | 1 | 1011000011101100110101101011010101101011101000010000000000000000 | 6.225 |
| 240 | 1 | 1011000011101100110101101011010101101011101000010000000000000000 | 6.225e |
| 250 | 1 | 1011000011101100110101101011010101101011101000010000000000000000 | 6.225e1 |

Fig. 6A

| Step | Base 10 Variable | Base 10 Number | | Base 2 Number | |
|---|---|---|---|---|---|
| | | Mantissa | Exp | Mantissa | Exp |
| 410 | 0 | 4.1625 | 1 | 1.010011010100000000000000000000000000000000000000000 | 5 |
| 420 | 0 | 9.242606... | -15 | 1.010011010100000000000000000000000000000000000000000 | -47 |
| 440 = 522, 524 (i=3) | -8 | 9.242606... | -7 | 1.1111000000110101010101001111111111111111111111111000 | -21 |
| 440 = 522, 524 (i=2) | -12 | 9.242606... | -3 | 1.0010111011011100010011010101101111111111111111111011 | -7 |
| 440 = 522, 524 (i=1) | -14 | 9.242606... | -1 | 1.1101100100111000010110001101111000001011111111111001 | -1 |
| 440 = 522, 524 (i=0) | -15 | 9.242606... | 0 | 1.0010011110000110101111100001101011001010100010000000000 | 3 |

| Step | Base 10 Variable | 64-bit Integer | String |
|---|---|---|---|
| 450 | -15 | 1001001111100001101101110001101011001010100010000000000000000000 | - |
| 460 | -15 | 1001001111100001101101110001101011001010100010000000000000000000 | - |
| 470 | -15 | 1001001111100001101101110001101011001010100010000000000000000000 | ?41625000000000000 |
| 480 | 1 | 1001001111100001101101110001101011001010100010000000000000000000 | ?41625000000000000 |
| 490 | 1 | 1001001111100001101101110001101011001010100010000000000000000000 | ?41625 |
| 240 | 1 | 1001001111100001101101110001101011001010100010000000000000000000 | 4?1625 |
| 240 | 1 | 1001001111100001101101110001101011001010100010000000000000000000 | 4.1625 |
| 250 | 1 | 1001001111100001101101110001101011001010100010000000000000000000 | 4.1625e |
| 250 | 1 | 1001001111100001101101110001101011001010100010000000000000000000 | 4.1625e1 |

*Fig. 6B*

Table 10A-1

| Fig. 8 Step | Lower | Value | Upper |
|---|---|---|---|
| Begin | - | 41.625 | - |
| 810 | 41.6249999999993 | 41.625 | 41.6250000000007 |

Table 10A-2

| Fig. 8 Step | ILower | IMidLower | IValue | IMidUpper | IUpper |
|---|---|---|---|---|---|
| 820 | 41624999999999993 | - | 41625000000000000 | - | 41625000000000007 |
| 830 | 41624999999999993 | 41624999999999996 | 41625000000000000 | 41625000000000003 | 41625000000000007 |

Table 10A-3

| Fig. 8/9 Step | IMidLower | IMidUpper | IValue | Divisor | IMod |
|---|---|---|---|---|---|
| 840=910 | 41624999999999996 | 41625000000000003 | 41625000000000000 | 10000 | - |
| 930 | 41624999999999996 | 41625000000000003 | 41625000000000000 | 10000 | 0 |
| 960 | 41624999999999996 | 41625000000000003 | 41625000000000003 | 10000 | 0 |
| 990 | 41624999999999996 | 41625000000000003 | 41625000000000003 | 10000 | 0 |

*Fig. 10A*

Table 10B-1

| Fig. 8 Step | Lower | Value | Upper |
|---|---|---|---|
| Begin | - | 0.149999999999944 | - |
| 810 | 0.149999999999667 | 0.149999999999944 | 0.150000000000000222 |

Table 10B-2

| Fig. 8 Step | ILower | IMidLower | IValue | IMidUpper | IUpper |
|---|---|---|---|---|---|
| 820 | 149999999999999667 | - | 149999999999999944 | - | 150000000000000222 |
| 830 | 149999999999999667 | 149999999999999805 | 149999999999999944 | 150000000000000083 | 150000000000000222 |

Table 10B-3

| Fig. 8/9 Step | IMidLower | IValue | IMidUpper | Divisor | IMod |
|---|---|---|---|---|---|
| 840=910 | 149999999999999805 | 149999999999999944 | 150000000000000083 | 10000 | - |
| 930 | 149999999999999805 | 149999999999999944 | 150000000000000083 | 10000 | 9944 |
| 950 | 149999999999999805 | 150000000000000000 | 150000000000000083 | 10000 | 9944 |
| 990 | 149999999999999805 | 150000000000000000 | 150000000000000083 | 10000 | 9944 |

Table 10C-1:

| Fig. 8 Step | Lower | Value | Upper |
|---|---|---|---|
| Begin | - | 1.02099847614441939e-130 | - |
| 810 | 1.02099847614441916e-130 | 1.02099847614441939e-130 | 1.02099847614441962e-130 |

Table 10C-2:

| Fig. 8 Step | ILower | IMidLower | IValue | IMidUpper | IUpper |
|---|---|---|---|---|---|
| 820 | 1020998476144441916 | - | 1020998476144441939 | - | 1020998476144441962 |
| 830 | 1020998476144441927 | 1020998476144441927 | 1020998476144441939 | 1020998476144441950 | 1020998476144441950 |

Table 10C-3:

| Fig. 8/9 Step | IMidLower | IValue | IMidUpper | Divisor | IMod |
|---|---|---|---|---|---|
| 840=910 | 1020998476144441927 | 1020998476144441939 | 1020998476144441950 | 10000 | - |
| 930 | 1020998476144441927 | 1020998476144441939 | 1020998476144441950 | 10000 | 1939 |
| 980 | 1020998476144441927 | 1020998476144441939 | 1020998476144441950 | 1000 | 1939 |
| 930 | 1020998476144441927 | 1020998476144441939 | 1020998476144441950 | 1000 | 939 |
| 980 | 1020998476144441927 | 1020998476144441939 | 1020998476144441950 | 100 | 939 |
| 930 | 1020998476144441927 | 1020998476144441939 | 1020998476144441950 | 100 | 39 |
| 980 | 1020998476144441927 | 1020998476144441939 | 1020998476144441950 | 10 | 39 |
| 930 | 1020998476144441927 | 1020998476144441939 | 1020998476144441950 | 10 | 9 |
| 950 | 1020998476144441927 | 1020998476144441940 | 1020998476144441950 | 10 | 9 |
| 990 | 1020998476144441927 | 1020998476144441940 | 1020998476144441950 | 10 | 9 |

CONVERSION OF FLOATING-POINT NUMBERS FROM BINARY INTO STRING FORMAT

CROSS-REFERENCE TO RELATED APPLICATION

This invention claims priority to Provisional Patent Application Ser. No. 60/667,192, entitled "CONVERSION OF FLOATING-POINT NUMBERS FROM BINARY INTO STRING FORMAT", filed Mar. 31, 2005, and naming Nathan Luther Reynolds as inventor. This provisional patent application is incorporated herein by reference, in its entirety and for all purposes.

COPYRIGHT NOTICE

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Many large businesses wish to take advantage of widespread use of the Internet to communicate with customers. However, communication protocols on the Internet are designed to deal primarily with text data, whereas numerical data is typically stored on computers in a non-text format. IEEE Standard 754 floating-point representation is the most commonly-used representation for real numbers on computers. IEEE Standard 754 floating-point representation represents real numbers in scientific notation, where each number has a mantissa, a base, and an exponent. For example, 62.25 could be represented as $62.25 \times 10^0$, where the mantissa is 62.25, the base is 10 and the exponent is 0 (indicating multiplication by 1). Preferably, floating-point numbers are stored in normalized form, which places the decimal point after the first non-zero digit. In normalized form, 62.25 is represented as $6.225 \times 10^1$. Computers store data in binary format, also referred to as base 2 numbers, which have digits that are either 1s or 0s. 62.25 in binary format is $111110.01 \times 2^0$ or $1.1111001 \times 2^5$ (normalized).

An important goal in the design of floating-point representation of numbers is to provide a representation that can approximate real numbers to a certain degree of accuracy. Consequently, a floating-point representation embodies the notions of significant digits and the location of the decimal point. IEEE Standard 754 floating-point numbers have three basic components: the sign, the exponent, and the mantissa. (The base of 2 is not explicitly represented.) The sign bit indicates whether the number is positive or negative. The mantissa is composed of a fraction, which corresponds to the significant digits, and may include an implicit leading digit. For example, in base 2, since the only possible non-zero digit is 1, a leading digit can be assumed and is not required to be stored explicitly, thereby saving storage space and increasing accuracy. The exponent indicates the location of the decimal point.

FIG. 1 shows the components of a floating-point representation of a real number and its binary equivalent. FIG. 1 includes various representations, including the IEEE 754 8-byte format, of the decimal number 3.14159. In exponential form, the number is represented as $3.14159 \times 10^0$. As a binary number, the number is represented as 11.00100100001111110011111100000001 (trailing zeros are omitted in this example). In binary exponential form, the number is shown as $1.100100100001111110011111100000001 \times 2^1$. In binary IEEE 754 8-byte form, the number has a one-bit sign component having a value of 0, indicating that the number is positive. The IEEE 754 8-byte form also includes an 11-bit exponent, in this example having a value of 100 0000 0000. Because the exponent field needs to represent both positive and negative exponents, a bias is added to the actual exponent to obtain the stored exponent. For IEEE 754 8-byte format, the bias is 1023. Thus, the value in the example of FIG. 1 is 1024 (indicating an exponent of 1=1024−1023).

The 52-bit mantissa, also known as a significand, represents the significant bits, also referred to as precision bits, of the number. In IEEE 754 8-byte format, the mantissa includes an implicit leading bit and the fraction bits. In FIG. 1, the mantissa has a value of 1001001000011111100111111100000001 (the leading 1 of the binary exponential form is not shown because it is implicit, and trailing zeros are not shown). Before printing a number in IEEE 754 8-byte format, the stored value is usually converted from base 2 to a character string.

In IEEE 754 8-byte format, the largest and smallest binary numbers that can be represented are $\pm(2-2^{-52})^{1023}$. The largest and smallest decimal numbers that can be represented are approximately $\pm 10^{308}$. Known conversion techniques may require up to 325 multiplication operations (308 for processing the exponent and one for each digit of a possible 17 digits in the mantissa) to convert the largest possible floating-point number to a character string. With web pages displaying numerous numerical values as character strings, conversion of real numbers to character strings can consume a substantial amount of CPU time and greatly reduce performance of web-based applications. In one example, CPU processing time spent by a web server to produce web pages and reports was analyzed. In that analysis, 67% of the CPU processing time of the web server was consumed by conversion of the floating-point representations of numbers into character strings. Similarly, another analysis of time spent by a Pentium IV processor using standardized conversion functions in a commonly available run-time library required from 6,000 to 14,000 cycles for each floating-point number converted to a character string.

What is needed is the ability to convert a floating-point representation of a number to a character string quickly, efficiently, and accurately. Preferably the technique would be useable by web servers in producing web pages and reports as well as by other software converting numerical data to character strings.

SUMMARY OF THE INVENTION

The present invention relates to a method, system, and computer program product that convert a floating-point representation of a number to a character string quickly, efficiently, and accurately. The inventive technique can be used by web servers in producing web pages and reports as well as by other software converting numerical data to character strings.

Mantissa bits are extracted from the floating-point representation of a value into an integer format. The mantissa bits of the integer format may be shifted left by a number of positions that is equal to a base 2 exponent of a first representation of the value. Prior to converting the value, the floating-point representation of the value can be divided by $2^n$, where n is the number of the mantissa bits in the floating-point representation of the value. A set of operations can then be performed to convert the result of the division to a number greater than or equal to 1.0 and less than 10.0. The set of operations may include multiplication operations and/or retrieving a constant from a lookup table.

In one embodiment, the set of operations comprises a lookup operation and a multiplication operation, where the lookup operation retrieves a constant from a lookup table, and the multiplication operation multiplies a current representation of the value by the constant. The lookup table may further comprise a value of a base 10 exponent for a result of the multiplication operation.

In another embodiment, the set of operations is a set of multiplication operations, and the set of multiplication operations includes no more than a maximum number of multiplication operations. For example, if a number of bits in an exponent of the floating-point representation of the value is 11, the maximum number of multiplication operations is 9. For each multiplication operation, a corresponding value can be added to a variable that is used to calculate a base 10 exponent to be appended to the character string representing the value.

BRIEF DESCRIPTION OF THE DRAWINGS

The present invention may be better understood, and its numerous objectives, features, and advantages made apparent to those skilled in the art by referencing the accompanying drawings.

FIG. 1 shows the components of a floating-point representation of a decimal number and its binary equivalent, as described above.

FIG. 3 shows an example of a conversion of a floating-point representation of a number to a character string in accordance with the steps of the flowchart of FIGS. 2A and 2B.

FIG. 6A shows an example of a conversion of a floating-point representation of a number to a character string in accordance with the steps of the flowcharts of FIGS. 4, 5A, and 5B.

FIG. 6B shows another example of a conversion of a floating-point representation of a number to a character string in accordance with the steps of the flowcharts of FIGS. 4, 5A, and 5B.

FIG. 10A shows an example of converting an integer to a character string in accordance with the flowcharts of FIGS. 8 and 9.

FIG. 10B shows another example of converting an integer to a character string in accordance with the flowcharts of FIGS. 8 and 9.

FIG. 10C shows another example of converting an integer to a character string in accordance with the flowcharts of FIGS. 8 and 9.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention can be used to quickly, efficiently, and accurately convert a value from a floating-point representation to a character string. While the IEEE 754 8-byte format is used as an example of a floating-point representation of a number throughout this document, one of skill in the art will understand that the invention is not limited to the IEEE 754 8-byte format. The techniques described herein can be applied to numbers represented in various other formats, including IEEE 754 4-byte format and IEEE 754 10-byte format. Generally, any format representing a real number in the form of a fractional component and an exponent can be converted to a character string using the techniques described herein, with only slight adjustments to account for differences in the floating-point representation.

Figure 2A:
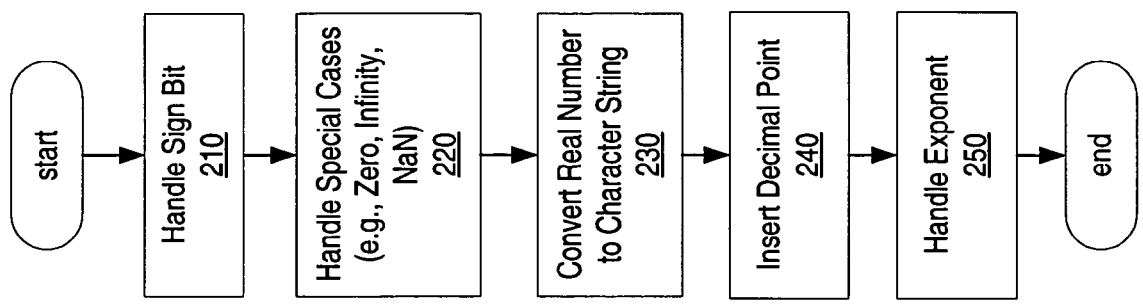
FIG. 2A shows a flowchart of a method for converting the floating-point representation of a number to a character string.

FIG. 2A shows a flowchart of a method for converting the floating-point representation of a number to a character string. In "Handle Sign Bit" step 210, a value of zero indicates a positive number, and a value of one represents a negative number. In "Handle Special Cases (e.g., Zero, Infinity, NaN)" step 220, values that have special representations in IEEE format are handled. IEEE format reserves exponent fields of all 0s and all 1s to denote special values. For example, if the exponent field has a zero and the fraction/mantissa field has a zero, then zero is the intended value (ignoring the assumed implicit leading bit). −0 and +0 are therefore distinct values. The values of +infinity and −infinity are denoted with an exponent of all 1s and a fraction of all 0s. The sign bit distinguishes +infinity and −infinity. Being able to define infinity as a special value is useful because it allows operations to continue past overflow situations (where a number is too large or too small to be represented in floating-point format). Operations with infinite values are well defined in IEEE floating-point representation. The value NaN (Not a Number) is used to represent a value that is not a real number. NaNs are represented by a bit pattern with an exponent of all 1s and a non-zero fraction.

Control proceeds from "Handle Special Cases (e.g., Zero, Infinity, NaN)" step 220 to "Convert Real Number to Character String" step 230. Alternative implementations of this step are discussed below with reference to FIGS. 2B and 4. From "Convert Real Number to Character String" step 230, control proceeds to "Insert Decimal Point" step 240. At "Insert Decimal Point" step 240, a decimal point is inserted into the character string. For example, the decimal point can be inserted after the first character of the character string representing the number. Control then proceeds to "Handle Exponent" step 250. For example, an 'e' (or other character indicative of an exponent) and the exponent's value are appended to the character string representing the value. One of skill in the art will understand that other ways of writing the number are possible.

Figure 2B:
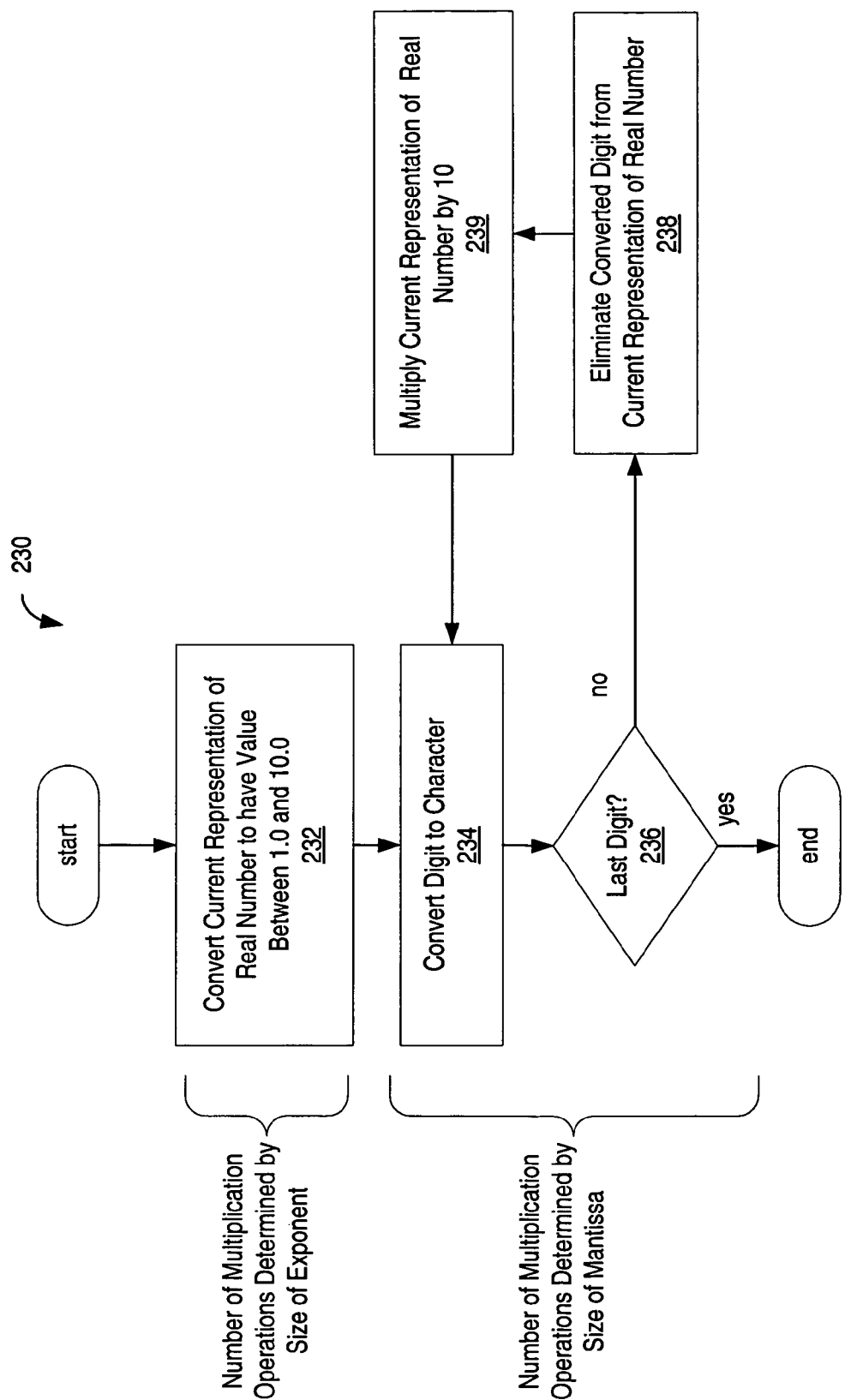
FIG. 2B shows a flowchart of one implementation of the "Convert Real Number to Character String" step of the flowchart of FIG. 2A.

FIG. 2B shows a flowchart of one implementation of the "Convert Real Number to Character String" step 230 of the flowchart of FIG. 2A. Control begins with "Convert Current Representation of Real Number to have Value between 1.0 and 10.0" step 232. In this step, the value of the real number is manipulated so that only one digit precedes the decimal point. "Convert Current Representation of Real Number to have Value between 1.0 and 10.0" step 232 converts the real number to have a value between 1.0 (inclusive) and 10.0 (exclusive).

To convert the real number to have a value between 1.0 and 10.0, the decimal point can be moved left or right to produce only one digit preceding the decimal point. In base 10, moving the decimal point to the right by one position is the equivalent of multiplying the current representation of the value by 10, whereas moving the decimal point to the left by one position is the equivalent of dividing the current representation of the value by 10 (or multiplying the current representation of the value by 0.1). This conversion will assure that one digit having a value between 1 and 9 precedes the decimal point, enabling conversion from each numerical digit to its character equivalent.

"Convert Current Representation of Real Number to have Value between 1.0 and 10.0" step 232 deals with normalizing the current representation of the real number, and therefore the number of multiplication operations is determined by the size of the exponent. In some implementations, "Convert Current Representation of Real Number to have Value between 1.0 and 10.0" step 232 may require up to 308 multiplication operations; for example, conversion of the largest value $10^{308}$ can be implemented using 308 multiplication operations, where each multiplication operation multiplies the current representation of the real number by 10. Such an implementation is very expensive, and a more efficient implementation of "Convert Current Representation of Real Number to have Value between 1.0 and 10.0" step 232 is discussed with reference to FIGS. 4, 5A, and 5B below.

From "Convert Current Representation of Real Number to have Value between 1.0 and 10.0" step 232, control proceeds to "Convert Digit to Character" step 234. Each digit has a character equivalent, so "Convert Digit to Character" step 234 converts the numeric digit to its character equivalent. Control then proceeds to "Last Digit" decision point 236. If the digit is the last digit in the current representation of the real number, the real number has been converted to a character string and control returns to the flowchart of FIG. 2A, having completed "Convert Real Number to Character String" step 230.

At "Last Digit" decision point 236, if the converted digit is not the last digit in the current representation of the real number, control proceeds to "Eliminate Converted Digit from Current Representation of Real Number" step 238. This step is discussed in further detail with reference to FIG. 3. From "Eliminate Converted Digit from Current Representation of Real Number" step 238, control proceeds to "Multiply Current Representation of Real Number by 10" step 239 to process additional digits in the current representation of the real number.

The number of times that "Multiply Current Representation of Real Number by 10" step 239 is executed (and the number of multiplication operations that will occur) is determined by the size of the mantissa. The longest number that can be represented in the 52 mantissa bits of the IEEE standard 754 floating-point format contains 17 digits. Consequently, the loop from "Convert Digit to Character" step 234 to "Multiply Current Representation of Real Number by 10" step 239 may be executed up to 17 times. These multiplication operations are in addition to the 308 operations that may be performed in "Convert Current Representation of Real Number to have Value between 1.0 and 10.0" step 232, for a possible total of 325 multiplication operations.

FIG. 3 shows an example of a conversion of a floating-point representation of a number to a character string in accordance with the steps of the flowchart of FIG. 2B. In this figure, a real number having a value of 3.14159 is converted to a character string. The table shows six iterations of the loop shown in FIG. 2B, with each entry in the table representing a step number that is executed and the resulting values of the current representation of the real number or the character string as a result of executing the respective step. In "Convert Real Number to Character String" step 230 of FIG. 2A, the processing shown in flowchart of FIG. 2B begins. At "Convert Current Representation of Real Number to have Value between 1.0 and 10.0" step 232, the current representation of the number, 3.14159, has a value between 1 and 10, so no numerical calculation is performed in "Convert Current Representation of Real Number to have Value between 1.0 and 10.0" step 232, as shown in the Comment column.

In the flowchart of FIG. 2B, control proceeds from "Convert Current Representation of Real Number to have Value between 1.0 and 10.0" step 232 to "Convert Digit to Character" step 234. As shown in FIG. 3, the character equivalent of the leading digit in the current representation of the real number, 3, is placed into the character string in the first position. Because 3 is not the last digit of the real number at "Last Digit" decision point 236, control in the flowchart of FIG. 2B passes to "Eliminate Converted Digit from Current Representation of Real Number" step 238. The digit corresponding to the character 3 is eliminated from the current representation of the real number, to provide a new current representation of the real number having a value of 0.14159. Control then proceeds to "Multiply Current Representation of Real Number by 10" step 239 in the flowchart of FIG. 2B.

At "Multiply Current Representation of Real Number by 10" step 239, the current representation of the real number has a value of 0.14159. The current representation of the real number is multiplied by 10 (as shown in the Comment column), thereby moving the decimal point one position to the right and producing a new value for the current representation of the real number of 1.4159. Control then returns to "Convert Digit to Character" step 234, where the leading digit, 1, is inserted into the character string. Because 1 is not the last digit of the real number at "Last Digit" decision point 236, control proceeds to "Eliminate Converted Digit from Current Representation of Real Number" step 238, where the converted digit 1 is removed from the current representation of the real number, which now has a value of 0.4159.

In the remaining third, fourth, fifth, and sixth iterations of the loop of FIG. 2B, each digit in the current representation of the real number is iteratively placed into the character string. In addition, each respective remaining current representation of the real number is multiplied by 10 when control returns to "Multiply Current Representation of Real Number by 10" step 239. Five multiplication operations are necessary to convert the mantissa 3.14159 to a character array having the characters 314159.

When the last digit is processed, 9 in this example, the number has been converted a character string having contents 314159, as shown in the last line of the table of FIG. 3.

"Convert Real Number to Character String" step 230 of FIG. 2A is completed. Control then proceeds to "Insert Decimal Point" step 240 and "Handle Exponent" step 250 of the flowchart of FIG. 2A. In "Handle Exponent" step 250, the result may be formatted for easier reading by not writing an exponent of zero, for example.

Figure 4:
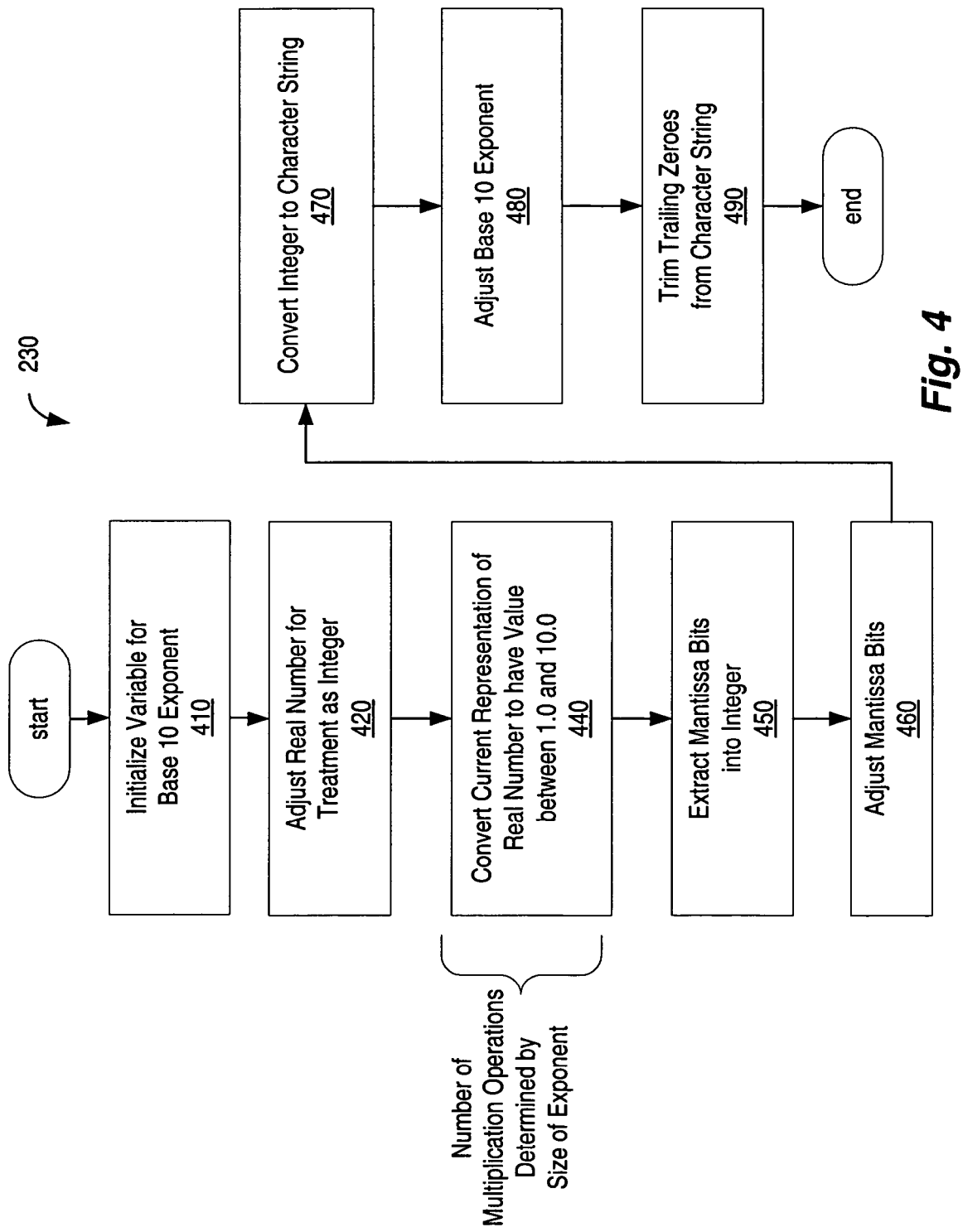
FIG. 4 shows a flowchart of a method for converting the floating-point representation of a number to a character string in accordance with one embodiment of the invention.

FIG. 4 shows a flowchart of a method for converting the floating-point representation of a number to a character string in accordance with one embodiment of the invention. The flowchart of FIG. 4 provides an alternative implementation of the method of FIG. 2A for "Convert Real Number to Integer" step 230.

In FIG. 4, control begins at "Initialize Variable for Base 10 Exponent" step 410. Because the numerical value of the real number changes during the process of performing "Convert Real Number to Integer" step 230, the base 10 exponent of the number is adjusted accordingly. In one embodiment of the invention, the base 10 exponent variable is initialized to have a value of zero. Control then proceeds to "Adjust Real Number for Treatment as Integer" step 420.

In "Adjust Real for Treatment as Integer" step 420, operations can be performed that compensate for the effects of the subsequent "Extract Mantissa Bits into Integer" step 450. Normally, the mantissa bits of a floating-point representation are treated as a fractional portion of the value being represented, and not as an integer. In one embodiment of the invention, "Adjust Real Number for Treatment as Integer" step 420 can be implemented by dividing the current representation of the value by $2^{52}$. This division operation offsets the later extraction of the mantissa bits into an integer that occurs in "Extract Mantissa Bits into Integer" step 450. Extraction of the mantissa bits into an integer produces a result that would have been produced if the mantissa bits were multiplied by $2^{52}$. For formats other than IEEE 754 8-byte format, similar adjustments may need to be made.

Figure 5A:
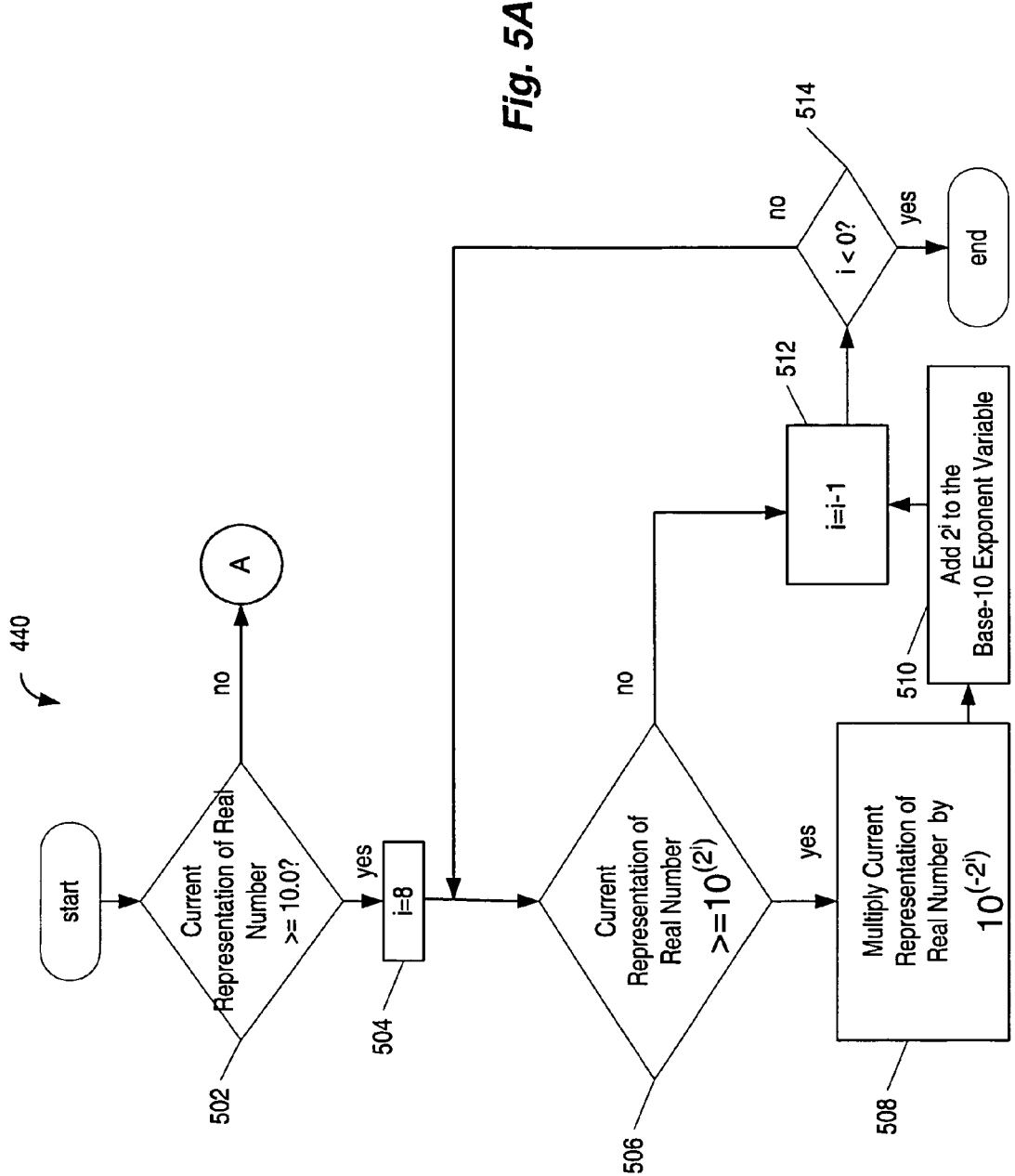
FIGS. 5A and 5B show one possible implementation of the "Convert Current Representation of Real Number to have Value between 1.0 and 10.0" step of the flowchart of FIG. 4 in accordance with one embodiment of the invention.
Figure 5B:
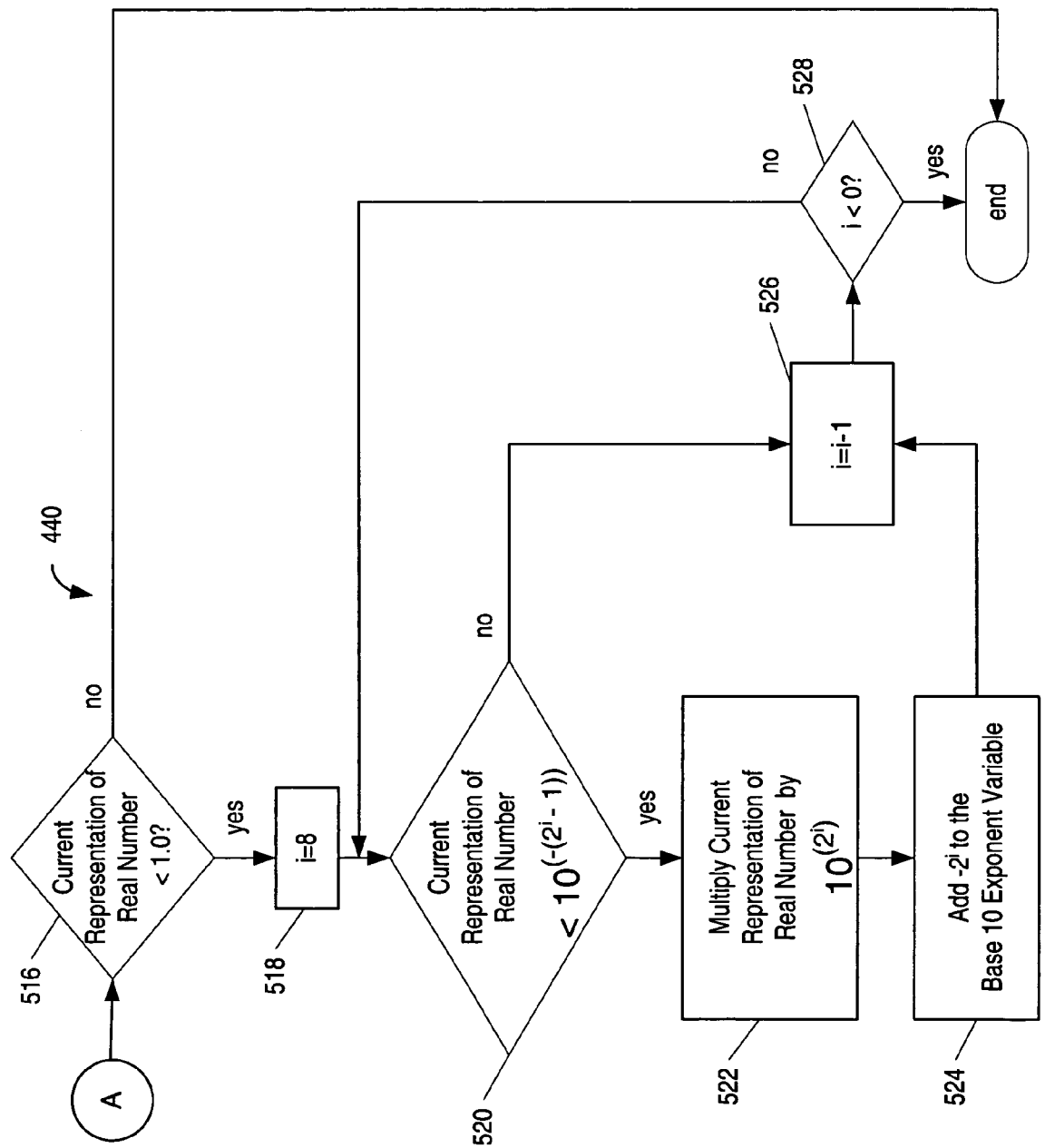

From "Adjust Real Number for Treatment as Integer" step 420, control proceeds to "Convert Current Representation of Real Number to have Value between 1.0 and 10.0" step 440. In one embodiment of the invention, "Convert Current Representation of Real Number to have Value between 1.0 and 10.0" step 440 can be implemented to provide a substantial improvement over the technique described with reference to FIG. 2B. As noted earlier, the technique described with reference to FIG. 2B "Multiply Current Representation of Real Number by 10" step 239 may perform one multiplication operation for each digit of the number being converted. Instead, in the embodiment shown in FIG. 4, a maximum number of multiplication operations are performed; for example, for IEEE 754 8-byte format, a maximum of 9 multiplication operations are performed. FIGS. 5A and 5B show one possible implementation of "Convert Current Representation of Real Number to have Value between 1.0 and 10.0" step 440.

Another possible implementation of "Convert Current Representation of Real Number to have Value between 1.0 and 10.0" step 440 is to use a lookup table. In one embodiment, a lookup table contains constants with values from $10^{-327}$ to $10^{308}$. Each constant in the lookup table is a multiple of 10 or a multiple of 0.1. To convert the real number to have a value between 1.0 and 10.0, a single multiplication operation can be performed to produce the same result. For example, if the current representation of the real number is between $10^{-243}$ and $10^{-244}$ (inclusive), the constant $10^{244}$ can be retrieved from the lookup table. The current representation of the real number can be multiplied by the constant $10^{244}$, which effectively moves the decimal point 244 places to the right in the base 10 representation of the number. As a result, the current representation of the real number is between 1.0 and 10.0.

From "Convert Current Representation of Real Number to have Value between 1.0 and 10.0" step 440, control proceeds to "Extract Mantissa Bits into Integer" step 450. In one embodiment, the mantissa bits are extracted into a 64-bit integer format. As mentioned previously, normally the mantissa bits of a floating-point representation are treated as a fractional portion of the value being represented, and not as an integer. For a number represented in IEEE standard 754 floating-point format, extracting the mantissa bits into an integer format operates as if an implicit decimal point were moved from the beginning of the mantissa to the end. Extracting the mantissa bits into an integer format has the effect of multiplying by $2^{52}$. In addition, extracting the mantissa bits into an integer explicitly places the implicit 1 of the mantissa as the first (left-most) digit of the integer.

As described above, to counteract this effect, "Adjust Real Number for Treatment as an Integer" step 430 was previously performed. For example, the adjustment to the value in "Adjust Real Number for Treatment as an Integer" step 430 can be implemented by dividing the current representation of the real number by $2^{52}$, which offsets the subsequent effect of multiplying by $2^{52}$ (which is the effect of extracting the mantissa bits into an integer). For formats other than IEEE 754 8-byte format, similar adjustments may need to be made.

From "Extract Mantissa Bits into Integer" step 450, control proceeds to "Adjust Mantissa Bits" step 460. The calculations performed thus far have ensured that the current representation of the real number has a leading digit between 1 and 9 in base 10 format. The equivalent base 2 representation of the numerical leading digit therefore has a value between 1 ($2^0$) and 9 ($2^3+1$), so that the unbiased value of the base 2 exponent is 0, 1, 2, or 3. To accurately represent the value in the integer format, the mantissa bits of IEEE standard 754 floating-point format can be adjusted by multiplying by the appropriate value, either $2^0$ (one, which has no effect), $2^1$, $2^2$, or $2^3$. Multiplication by $2^1$, $2^2$, or $2^3$ can be accomplished by shifting the mantissa bits to the left by, respectively, 1, 2, or 3 positions.

After "Adjust Mantissa Bits" step 460, the bits in the integer representation of the value are accurate. Control proceeds to "Convert Integer to Character String" step 470, where the digits in the integer are converted to a character string. In one embodiment, an additional process may be used at this point to "round" the integer so that the resulting rounded integer is converted to the shortest possible character string that accurately represents the value of the real number. This rounding algorithm is discussed in further detail with reference to FIG. 8. The conversion from integer format to character string format can be performed, for example, by readily available integer-to-character conversion functions. One example of such an integer-to-character conversion function is the i64 to a function of the C programming language, which converts a 64-bit integer to a character format and is available in various commercially-available run-time libraries.

After "Convert Integer to Character String" step 470, the string contains the character values equivalent to the decimal representation of the value, with an implicit decimal point at the end of the character string. To place the value into normalized form, the implicit decimal point may be moved, for example, from the end of the character string to the first position after the first character in the character string. To reflect this change, the base 10 exponent is adjusted in "Adjust Base 10 Exponent" step 480. For example, if the character string has 14 characters, the decimal point is moved from the end of the character string by 13 positions to the left, with the result that the decimal point is positioned after the first character. The numerical value of the base 10 exponent is adjusted to reflect this change. To reflect movement of the decimal point by 13 positions to the left, a value of 13 is added to the base 10 exponent.

From "Adjust Base 10 Exponent" step 480, control proceeds to "Trim Trailing Zeroes from Character String" step 490, where any trailing zeroes are trimmed from the end of the character string. Control then returns to the flowchart of FIG. 2A, having completed the "Convert Real Number to Integer" step 230. Control then proceeds to "Insert Decimal Point" step 240 and "Handle Exponent" step 250. In one embodiment, an 'e' and the value of the base 10 exponent are appended to the character string. Other refinements may be made. For example, if the base 10 exponent is 0, the 'e' and the value of 0 may not be printed at all. For small exponents, the decimal point may be repositioned; for example, 6.225e1 may be printed simply as 62.25. Various other manipulations of the format of the value are within the scope of the invention.

FIGS. 5A and 5B show one implementation of the "Convert Current Representation of Real Number to have Value between 1.0 and 10.0" step 440 of FIG. 4. FIG. 5A is used when the current representation of the real number has a value greater than or equal to 10.0 and must be decreased to fall between 1.0 (inclusive) and 10.0 (exclusive). FIG. 5B is used when the current representation of the real number has a value less than 1.0.

In FIG. 5A, an initial decision is made in "Current Representation of Real Number>=10.0?" decision point 502. If the real number has a value that is 10.0 or greater, control proceeds to "i=8" step 504. If the real number does not have a value that is 10.0 or greater, control proceeds to step 516 of the flowchart shown in FIG. 5B.

In FIG. 5A, at "i=8" step 504, a counter i is initialized to have a value of 8. The reason that the counter i is initialized to 8 is explained in further detail below. At "Current Representation of Real Number>=$10^{(2^i)}$" decision point 506, a comparison is made of the size of the current representation of the real number with 10 raised to an exponent, where the exponent itself is a power of 2. Recall that $10^{308}$ is the largest integer that can be represented in IEEE 754 8-byte format. To convert the current representation of the real number to have a value between 1.0 and 10.0, the current representation of the real number is manipulated by either multiplying or dividing by 10 raised to a power of 2. $10^{2^8} = 10^{256}$ is the largest number less than or equal to $10^{308}$ with an exponent that is a power of 2. Consequently, i is initially set to 8.

At "Current Representation of Real Number>=$10^{(2^i)}$", decision point 506, if the current representation of the real number is greater than or equal to $10^{(2^i)}$, control proceeds to "Multiply Current Representation of Real Number by $10^{(-2^i)}$" step 508, where the current representation of the real number is decreased in size by multiplying the current representation of the real number by $10^{(-2^i)}$ (which is equivalent to dividing the current representation of the real number by $10^{(2^i)}$). Control then proceeds to "Add $2^i$ to the Base 10 Exponent Variable" step 510, where the exponent is increased to compensate for the smaller value of the current representation of the real number. Control then proceeds to "i=i-1" step 512, where the value of the counter i is decremented in preparation for the next iteration of the loop. Control proceeds to "i<0" decision point 514, where a determination is made whether the counter i has a value less than 0, indicating that conversion of the current representation of the real number to a value between 1.0 and 10.0 is complete. At "i<0" decision point 514, if i has a value less than 0, "Convert Current Representation of Real Number to have Value between 1.0 and 10.0" step 440 of FIG. 4 is complete. If i is not less than 0, control returns to "Current Representation of Real Number>=$10^{(2^i)}$" decision point 506 to compare using a new value of i in the exponent.

During iterations of the loop shown in FIG. 5A, up to 9 multiplication operations are performed. These 9 multiplication operations include successively multiplying a current representation of the real number by a multiple of 0.1, thereby gradually decreasing the value of the current representation of the real number to a value between 1.0 (inclusive) and 10.0 (exclusive). Note that each multiple of 0.1 is of the form $10^{-2^i}$ for values of i from 0 through 8. For each multiplication operation, a corresponding adjustment is made to the base 10 exponent of the value to properly position the decimal point. For example, if the value is multiplied by $10^{-8}$, then a value of 8 is added to the base 10 exponent, reflecting the fact that the value of the current representation of the number is smaller by $10^{-8}$.

As noted previously, FIGS. 5A and 5B show one implementation of the "Convert Current Representation of Real Number to have Value between 1.0 and 10.0" step 440 of FIG. 4. FIG. 5B is used when the current representation of the real number has a value less than 1.0 and must be increased to fall between 1.0 and 10.0.

In FIG. 5B, an initial decision is made in "Current Representation of Real Number<1.0?" decision point 516. If the real number has a value that is less than 1.0, control proceeds to "i=8" step 518. If the real number does not have a value that is less than 1.0, processing in FIG. 5B is complete.

In FIG. 5B, at "i=8" step 518, a counter i is initialized to have a value of 8. At "Current Representation of Real Number<$10^{-(2^{i-1})}$" decision point 520, a comparison is made of the size of the current representation of the real number with 10 raised to an exponent, where the exponent itself is a negative power of 2 minus one. If the current representation of the real number is less than $10^{-(2^{i-1})}$, control proceeds to "Multiply Current Representation of Real Number by $10^{(2^i)}$" step 522, where the current representation of the real number is increased in size by multiplying the current representation of the real number by $10^{(2^i)}$. Control then proceeds to "Add $-2^i$ to the Base 10 Exponent Variable" step 524, where the exponent is decreased to compensate for the larger value of the current representation of the real number. Control then proceeds to "i=i-1" step 526, where the value of the counter i is decremented in preparation for the next iteration of the loop. Control proceeds to "i<0" decision point 528, where a determination is made whether the counter i has a value less than 0, indicating that conversion of the current representation of the real number to a value between 1.0 and 10.0 is complete. At "i<0" decision point 528, if i has a value less than 0, "Convert Current Representation of Real Number to have Value between 1.0 and 10.0" step 440 of FIG. 4 is complete. If i is not less than 0, control returns to "Current Representation of Real Number<$10^{-(2^i-1)}$" decision point 520 to compare using a new value of i in the exponent.

During iterations of the loop shown in FIG. 5B, up to 9 multiplication operations are performed. These 9 multiplication operations include successively multiplying a current representation of the real number by a multiple of 10. For example, in IEEE 754 8-byte format, if the value<1.0, each successive operation multiplies a current representation of the value by one of the following multiples of 10: $10^{256}$, $10^{128}$, $10^{64}$, $10^{32}$, $10^{16}$, $10^8$, $10^4$, $10^2$, or $10^1$. These multiplication operations thereby gradually increase the value of the current representation of the real number to a value between 1.0 and 10.0. Note that each multiple of 10 is of the form $10^{2^i}$ for values of i from 0 through 8. For each multiplication operation, a corresponding adjustment is made to the base 10 exponent of the value to properly position the decimal point. For example, if the value is multiplied by $10^8$, then a value of −8 is added to the base 10 exponent (in other words, a value of 8 is subtracted from the base 10 exponent, reflecting the fact that the value of the current representation of the number is larger by $10^8$).

FIG. 6A shows an example of a conversion of a floating-point representation of a number to a character string in accordance with the steps of the flowcharts of FIGS. 4, 5A, and 5B. The number being converted in this example is the decimal number 62.25. Initially, the number has a value of $6.225*10^1$, as shown in the base 10 mantissa and exponent fields. The number has a binary value of $1.1111001*2^5$, as shown in the base 2 mantissa and exponent fields. (Note that the implicit leading 1 is shown in the base 2 column of the table.) A base 10 variable is initialized to have a value of zero, as described with reference to "Initialize Variable for Base 10 Exponent" step 410.

Control then proceeds to "Adjust Real Number for Treatment as Integer" step 420 of FIG. 4. As described above, this step involves dividing the current representation of the value by $2^{52}$. This division operation changes the base 2 exponent from 5 to −47. The result of the division operation in base 10 is $1.3822276656...*10^{-14}$, as shown in the base 10 mantissa and exponent columns.

Control then proceeds to "Convert Current Representation of Real Number to have Value between 1.0 and 10.0" step 440. This step is described with reference to the flowchart of FIG. 5B. Recall that FIG. 5B is used when the current representation of the real number has a value less than 1.0 and must be increased to fall between 1.0 and 10.0.

In FIG. 5B, an initial decision is made in "Current Representation of Real Number<1.0?" decision point 516. The real number $1.3822276656...*10^{-14}$ has a value that is less than 1.0, so control proceeds to "i=8" step 518. At "Current Representation of Real Number<$10^{-(2^i-1)}$" decision point 520, a comparison is made of the size of the current representation of the real number with 10 raised to an exponent, where the exponent itself is a negative power of 2 minus one. In the example shown, the value of $1.3822276656...*10^{-14}$ is not less than <$10^{-(2^i-1)}$ until i=3, as shown in the next row of the table. When i=3, $1.3822276656...*10^{-14}$ is less than $10^{-(2^i-1)}=10^{-7}$. At that point, the current representation of the real number is less than $10^{-(2^i-1)}$, so control proceeds to "Multiply Current Representation of Real Number by $10^{(2^i)}$" step 522, where the current representation of the real number is increased in size by multiplying the current representation of the real number by $10^{(2^i)}=10^8$, producing a base 10 result of $1.3822276656...*10^{-6}$, as shown in the base 10 mantissa and exponent columns of the table. Note that the base 2 number also changes as a result of the multiplication, producing a result of $1.0111..*2^{-20}$, as shown in the base 2 mantissa and exponent columns of the table.

Control then proceeds to "Add $-2^i$ to the Base 10 Exponent Variable" step 524, where the base 10 exponent variable is decreased by a value of 8 to compensate for the larger value of the current representation of the real number, producing a base 10 exponent variable with a value of −8. Control then proceeds to "i=i−1" step 526, where the value of the counter i is decremented in preparation for the next iteration of the loop. Control proceeds to "i<0" decision point 528, where a determination is made whether the counter i has a value less than 0, indicating that conversion of the current representation of the real number to a value between 1.0 and 10.0 is complete. At "i<0" decision point 528, i now has a value of 2, so control returns to "Current Representation of Real Number<$10^{-(2^i-1)}$" decision point 520 to compare using a value of i=2 in the exponent.

During iterations of the loop shown in FIG. 6A, three multiplication operations are performed. These three multiplication operations include successively multiplying a current representation of the real number by a multiple of 10, in this case $10^8$, $10^4$, and $10^2$. These multiplication operations thereby gradually increase the value of the current representation of the real number to a value between 1.0 and 10.0. For each multiplication operation, a corresponding adjustment is made to the base 10 exponent of the value to properly position the decimal point. For example, when the value is multiplied by $10^8$, then a value of −8 is added to the base 10 exponent (in other words, a value of 8 is subtracted from the base 10 exponent, reflecting the fact that the value of the current representation of the number is larger by $10^8$).

Upon completion of three iterations of the loop, the current base 10 representation of the value is $1.3822276656...*10^0$, which is a value between 1 and 10. The base 2 equivalent is $1.011...*2^0$, as shown in the last row of the table for step 440. The base 10 variable has a value of −14. Processing of "Convert Current Representation of Real Number to have Value between 1.0 and 10.0" step 440 of FIG. 4 is complete. Control then proceeds to "Extract Mantissa Bits into Integer" step 450 of FIG. 4.

In "Extract Mantissa Bits into Integer" step 450 of FIG. 4, the mantissa of the base 10 number is extracted into a 64-bit integer. Recall that the implicit leading one is shown in the base 2 number column of the previous table. Extracting the mantissa (with the leading one) produces the 64-bit integer shown. Note that the extraction has the effect of moving the decimal point from after the implicit leading one to the end of the integer, or of moving the decimal point 52 places to the right (i.e., this is the same effect as multiplying the value by $2^{52}$). As described earlier, in "Adjust Real Number for Treatment as Integer" step 420, the current representation of the value was divided by $2^{52}$ in preparation for this effect. Control proceeds to "Adjust Mantissa Bits" step 460, where the mantissa bits are adjusted to reflect the base 2 exponent. The current base 2 exponent is 0, as shown in the table, so no adjustment is made at this step. Control then proceeds to "Convert Integer to Character String" step 470. The resulting string has a value of '?6225000000000000'. (A ? character is used to show a leading blank appended to the character string.) Control then proceeds to "Adjust Base 10 Exponent" step 480, where the base 10 exponent is adjusted to account for moving the implicit decimal point from the end of the character string '?6225000000000000' to the left by 15 spaces (thereby effectively dividing the integer value by $10^{15}$, which is compensated by adding 15 to the base 10 exponent, changing the value from −14 to 1).

After completion of "Adjust Base 10 Exponent" step 480, the character equivalent of the real number has been determined. Control then proceeds to "Trim Trailing Zeroes from Character String" step 490, where trailing zeroes are trimmed from the character string to produce the shortest possible character string. (These trailing zeroes appear after the decimal point and therefore have no effect on the value or the base 10 exponent.) After "Trim Trailing Zeroes from Character String" step 490, control returns to "Insert Decimal Point" step 240 of FIG. 2, where a decimal point is inserted into the character string. In this example, the leftmost blank (represented by ?) is moved to a position after the first non-zero digit, and then the blank space is changed to a decimal point. Control proceeds to "Handle Exponent" step 250 of FIG. 2, where an 'e' and the base 10 variable value of 1 are appended to the character string. The result is a character string having the value 6.225e1. One of skill in the art will understand that this value may be formatted differently for printing, but the value is the character equivalent of the real number 62.25.

FIG. 6B shows another example of a conversion of a floating-point representation of a number to a character string in accordance with the steps of the flowcharts of FIGS. 4, 5A, and 5B. The number being converted in this example is the decimal number 41.625. Initially, the number has a value of $4.1625*10^1$, as shown in the base 10 mantissa and exponent fields. The number has a binary value of $1.01001101*2^5$, as shown in the base 2 mantissa and exponent fields. A base 10 variable is initialized to have a value of zero, as described with reference to "Initialize Variable for Base 10 Exponent" step 410.

Control then proceeds to "Adjust Real Number for Treatment as Integer" step 420 of FIG. 4. As described above, this step involves dividing the current representation of the value by $2^{52}$. This division operation changes the base 2 exponent from 5 to −47. The result of the division operation in base 10 is $9.242606\ldots*10^{-15}$, as shown in the base 10 mantissa and exponent columns.

The first table of FIG. 6B shows four iterations of "Convert Current Representation of Real Number to have Value between 1.0 and 10.0" step 440. As shown in the step column of the table, these iterations are for i having values of 3, 2, 1, and 0. Upon completion of four iterations of the loop, the current base 10 representation of the value is $9.242606\ldots*10^{-15}$, which is a value between 1 and 10. The base 2 equivalent is $1.001\ldots*2^3$, as shown in the last row of the table for step 440. The base 10 variable has a value of −15. Processing of "Convert Current Representation of Real Number to have Value between 1.0 and 10.0" step 440 of FIG. 4 is complete. Control then proceeds to "Extract Mantissa Bits into Integer" step 450 of FIG. 4.

In "Extract Mantissa Bits into Integer" step 450 of FIG. 4, the mantissa of the base 2 number is extracted into a 64-bit integer, as shown in the second table. Control proceeds to "Adjust Mantissa Bits" step 460, where the mantissa bits are adjusted to reflect the base 2 exponent. The current base 2 exponent is 3, as shown in the first table, so three zeros are appended at the end of the 64-bit integer. Control then proceeds to "Convert Integer to Character String" step 470. The resulting string has a value of '?41625000000000000'. (A ? character is used to show a leading blank appended to the character string.) Control then proceeds to "Adjust Base 10 Exponent" step 480, where the base 10 exponent is adjusted to account for moving the implicit decimal point from the end of the character string '?41625000000000000' to the left by 16 spaces (thereby dividing the integer value by $10^{16}$, which is compensated by adding 16 to the base 10 exponent, changing the value from −15 to 1).

After completion of "Adjust Base 10 Exponent" step 480, the character equivalent of the real number has been determined. Control proceeds to "Trim Trailing Zeroes from Character String" step 490, where the trailing zeroes are trimmed to produce a character string of '?41625'. Control returns to "Insert Decimal Point" step 240 of FIG. 2, where a decimal point is inserted into the character string. In this example, the leftmost blank (represented by ?) is moved to a position after the first non-zero digit, and then the blank space is changed to a decimal point. Control proceeds to "Handle Exponent" step 250 of FIG. 2, where an 'e' and the base 10 variable value of 1 are appended to the character string. The result is a character string having the value 4.1625e1. One of skill in the art will understand that this value may be formatted differently for printing, but the value is the character equivalent of the real number 41.625.

One issue related to formatting and printing floating-point numbers is conciseness. As shown in the examples above, each binary floating-point number is represented as a fixed number of bits (or bytes). An infinite number of strings can accurately represent a single binary floating-point number because the binary floating-point number has a fixed number of bits and the string can have an infinite number of characters, at least theoretically. Even when taking into account the fact that computer memory is finite, many different character strings can be used to represent a single binary floating-point number having a fixed number of bits (or bytes).

Figure 7:
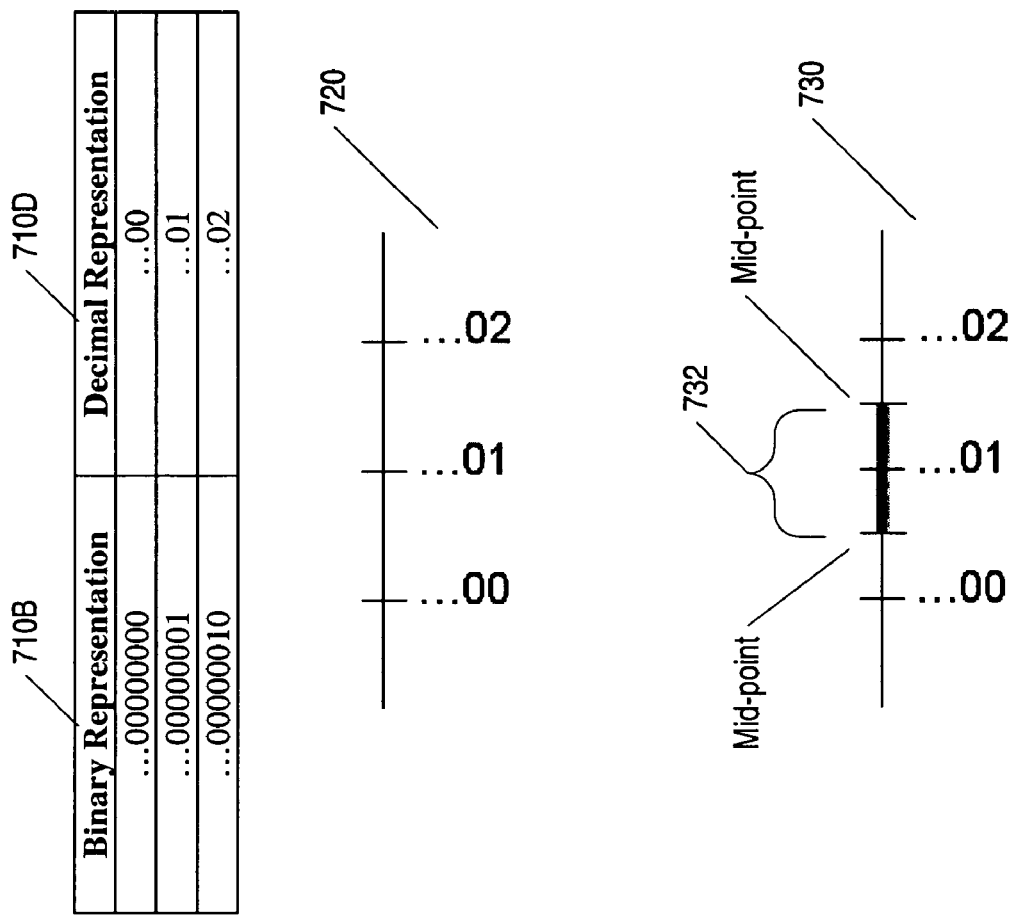
FIG. 7 illustrates rounding of floating point numbers using three fixed binary floating-point numbers.

FIG. 7 illustrates rounding of floating point numbers using three fixed binary floating-point numbers. A binary representation 710B of each number is shown, along with a decimal representation 710D of the number. The numbers are next to each other in sequence, such that only the least significant bits change. Because of the limited number of bits, no fixed binary floating-point number can be represented between the numbers.

These three numbers are shown on a real number line 720 in FIG. 7. Because of the fixed number of bits, none of the real numbers between these points can be uniquely represented. Thus, real numbers between two adjacent values must be rounded to the nearest floating-point number. One way to round the real number is to take the mid-point between two floating-point numbers. Real numbers falling between those two mid-points are rounded to the same binary floating-point number. Thus, the real numbers that fall within the segment 732 (between the two mid-points) on real number line 730 are rounded to . . . 01. The IEEE 754 specification provides a specification for rounding the mid-points.

The real numbers in segment 732 of real number line 730 show that one binary floating-point number can represent an infinite number of real numbers. Each real number can be represented as a string of characters; thus, each binary floating-point number can be represented as an infinite number of strings. When formatting the real number for presentation, it is preferable to choose the shortest character string from the infinite number of possible character strings.

Figure 8:
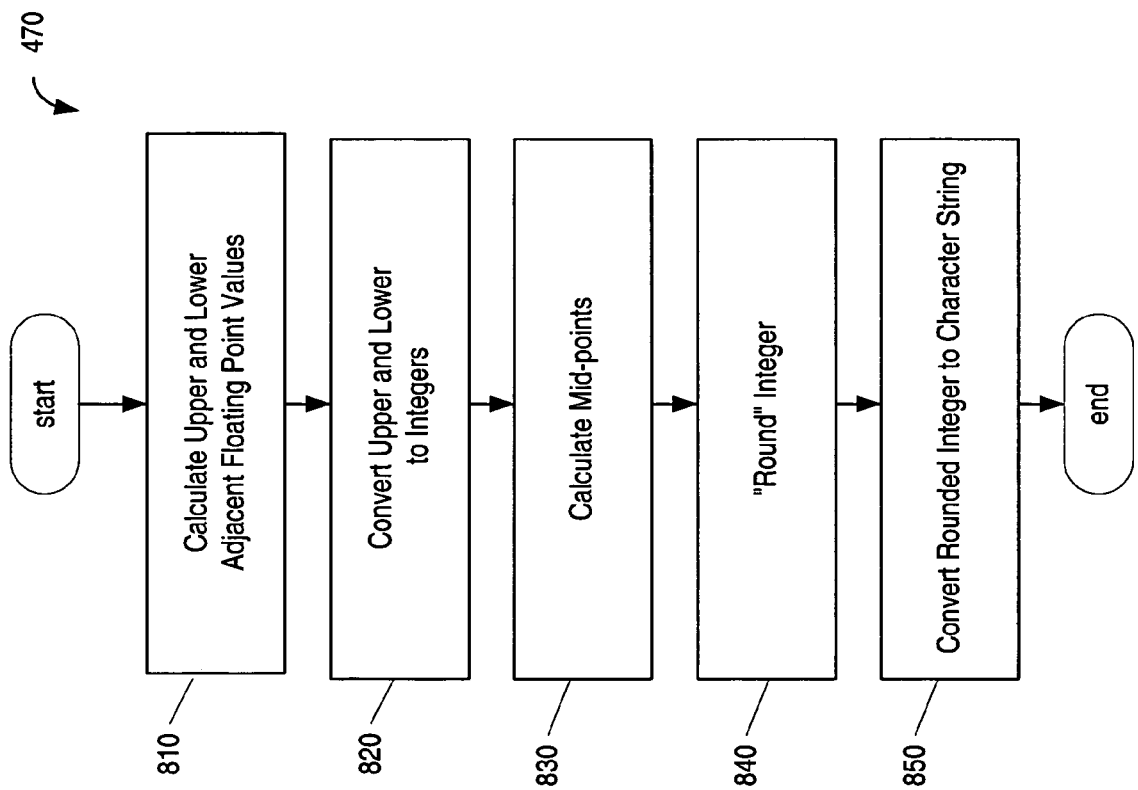
FIG. 8 shows one possible implementation of the "Convert Integer to Character String" step of FIG. 4 in accordance with one embodiment of the invention.

FIG. 8 is a flowchart for determining the shortest character string to represent a floating point number in accordance with one embodiment of the invention. As noted above, this process may be used as one implementation of "Convert Integer to Character String" step 470 of FIG. 4 to determine the shortest possible string that accurately represents the value of the floating point number. The conversion from the floating point value to an integer can be performed by performing steps 410 through 460 of the flowchart of FIG. 4.

When converting the resulting integer to a character string, the implementation of "Convert Integer to Character String" 470 can include the method shown in FIG. 8. To determine the number of digits that the value can be rounded, the algorithm calculates mid-points between two pairs of the three numbers (similar to the two mid-points related to segment 732 of FIG. 7). The least significant digits are rounded, keeping the desired number between the two mid-points. The desired number is then converted to a character string using a standard integer-to-character conversion function as described above with reference to "Convert Integer to Character String" step 470 of FIG. 4.

The floating-point number to be converted is stored in a floating-point variable named Value and in an integer format named IValue. The rounding process begins in "Calculate Upper and Lower Adjacent Floating Point Values" step 810, where the immediately adjacent floating point values are calculated. Calculation of the Lower value can be performed by subtracting 1 from the mantissa bits for Value. The Upper value can be calculated by adding 1 to the mantissa bits for Value. Overflow and underflow conditions should be addressed when adding or subtracting values from the mantissa bits. For example, if the mantissa bits are all 0s (zeroes), the exponent should be adjusted to avoid mantissa underflow. If the mantissa bits are all 1s, the exponent should be adjusted to avoid mantissa overflow.

Control proceeds from "Calculate Upper and Lower Adjacent Floating Point Values" step 810 to "Convert Upper and Lower to Integers" step 820. At this point, steps 410 through 460 of the flowchart of FIG. 4 can be used to convert Upper and Lower to integers. The integer forms of Value, Upper, and Lower are referred to herein as IValue, IUpper, and ILower. Control then proceeds to "Calculate Mid-points" step 830. An IMidUpper mid-point between IUpper and IValue is calculated as (IUpper−IValue)/2+Value. The value of IValue is added to avoid potential overflow. An IMidLower mid-point between ILower and IValue is calculated as (UValue−ILower)/2+ILower.

From "Calculate Mid-points" step 830 to "'Round' Integer" step 840. "'Round Integer'" step 440 is discussed in further detail with reference to FIG. 9. Control proceeds from "'Round' Integer" step 840 to "Convert Rounded Integer to Character String" step 850. The rounded integer is then converted to a character string using a standard integer-to-character conversion function as described above with reference to "Convert Integer to Character String" step 470 of FIG. 4. At this point, "Convert Integer to Character String" 470 of FIG. 4 is complete, and control returns to "Adjust Base 10 Exponent" step 480 of FIG. 4.

Figure 9:
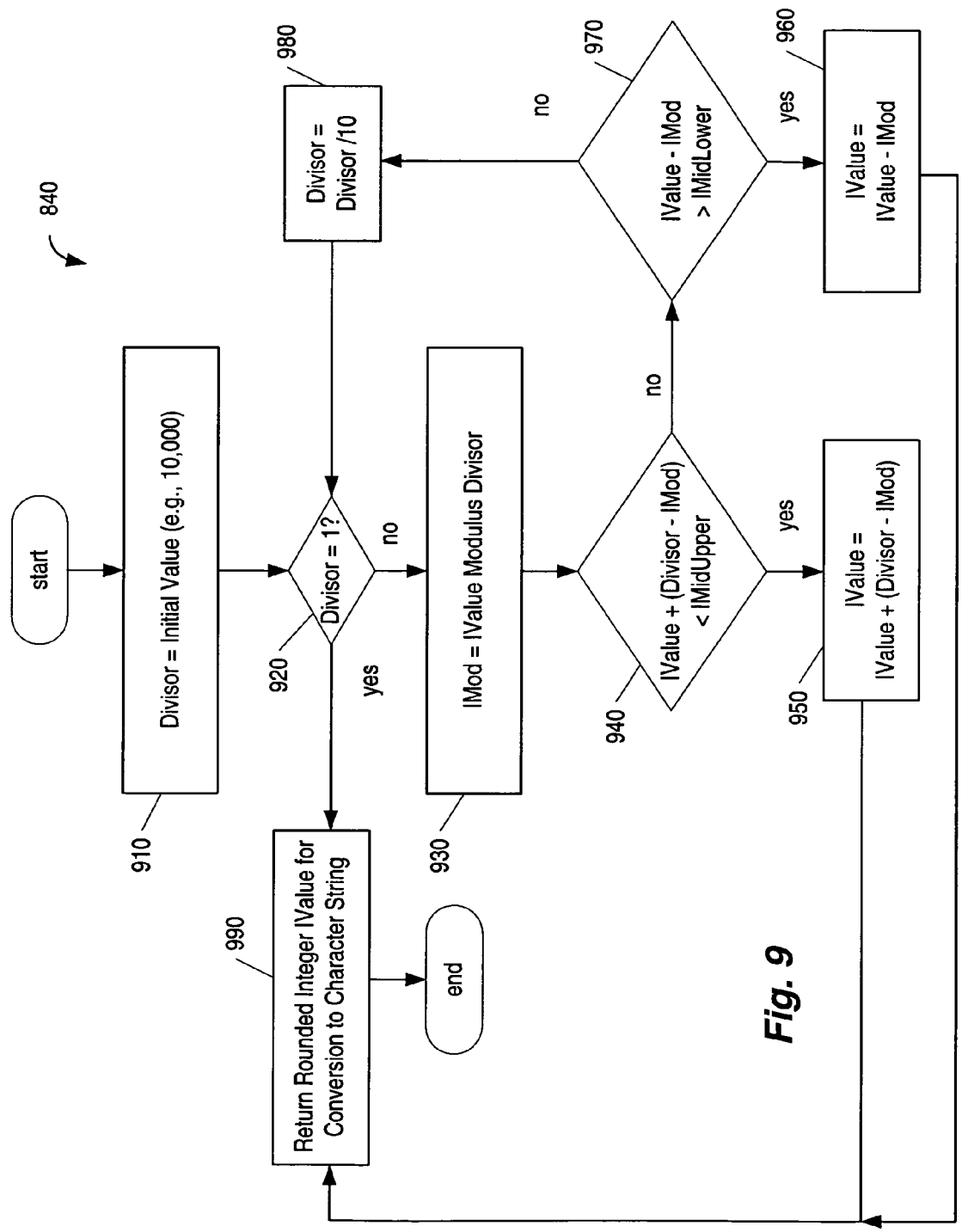
FIG. 9 shows one possible implementation of the "'Round' Integer" step of FIG. 8 in accordance with one embodiment of the invention.

FIG. 9 shows one possible implementation of the "'Round' Integer" step 840 of FIG. 8 in accordance with one embodiment of the invention. At "Divisor=Initial Value (e.g., 10,000)" step 910, a divisor is set to an initial value. In this example, the divisor is set to 10,000. Control proceeds to "Divisor=1" decision point 920, where a determination is made whether the divisor now has a value of 1. Having just assigned a value of 10,000 to the divisor, the result of the determination at "Divisor=1" decision point 920 is 'no,' and control proceeds to "IMod=IValue Modulus Divisor" step 930. "IMod=IValue Modulus Divisor" step 930 places the result of IValue Modulus Divisor into the IMod variable. The modulus function divides the number by the divisor and returns the remainder from the division operation.

From ""IMod=IValue Modulus Divisor" step 930, control proceeds to "IValue+(Divisor−IMod)<IMidUpper" step 940. "IValue+(Divisor−IMod)<IMidUpper" step 940 determines whether the difference between IValue and (Divisor−IMod) is less than the variable IMidUpper, which would indicate IValue can be "rounded" up. If so, control proceeds to "IValue=IValue+(Divisor−IMod)" step 950, where Ivalue is "rounded" by incrementing IValue by (Divisor−IMod). Control then proceeds to "Return Rounded Integer IValue for Conversion to Character String" step 990. Processing of "'Round' Integer" step 840 of FIG. 8 is then complete, and control returns to "Convert Rounded Integer to Character String" step 850, where the rounded value of IValue is converted to a character string. At that point, processing of "Convert Integer to Character String" step 470 of FIG. 4 is completed, and control returns to "Adjust Base 10 Exponent" step 480 of FIG. 4.

Referring again to FIG. 9, at "IValue+(Divisor−IMod)<IMidUpper" step 940, if the difference between IValue and (Divisor−IMod) is not less than the variable IMidUpper, control proceeds to "IValue−IMod>IMidLower" step 970. If "IValue−IMod>IMidLower" step 970 indicates that IValue−IMod is greater than the value of IMidLower, IValue can be "rounded" down. Control proceeds to "IValue=IValue−IMod" step 960, where IValue is decreased by the amount of IMod. Control then proceeds to "Return Rounded Integer IValue for Conversion to Character String" step 990. Processing of "'Round' Integer" step 840 of FIG. 8 is then complete, and control returns to "Convert Rounded Integer to Character String" step 850, where the rounded value of IValue is converted to a character string. At that point, processing of "Convert Integer to Character String" step 470 of FIG. 4 is completed, and control returns to "Adjust Base 10 Exponent" step 480 of FIG. 4.

Referring again to FIG. 9, at "IValue−IMod>IMidLower" step 970, if the difference between IValue and IMod is not greater than the value if IMidLower, rounding the current value of IValue would not produce the shortest possible character string. Control proceeds to "Divisor=Divisor/10" step 980. The divisor is divided by 10, and control returns to "Divisor=1" decision point 920, where the value of the divisor is tested. If the value of the divisor is 1, control proceeds to "Return Rounded Integer IValue for Conversion to Character String" step 990. Processing of "'Round' Integer" step 840 of FIG. 8 is then complete, and control returns to "Convert Rounded Integer to Character String" step 850, where the rounded value of IValue is converted to a character string. At that point, processing of "Convert Integer to Character String" step 470 of FIG. 4 is completed, and control returns to "Adjust Base 10 Exponent" step 480 of FIG. 4.

In the algorithm presented in FIG. 8, three floating-point numbers are converted into 64-bit integers in order to find each mid-point. This process can be reduced by calculating only integer values for Lower, ILower and IMidLower. A value of the upper mid-point can be calculated as IMidUpper=IValue+(IValue−IMidLower). Mantissa overflow and underflow conditions must be taken into consideration when calculating the upper mid-point.

An alternative solution is to use a look up table that has the "delta" (IValue−IMidLower) already calculated. Boundary cases can be handled by dividing or multiplying the delta by 2. The look-up table would contain one entry for each possible base-2 exponent value. For conversion of 8-byte floating-point numbers, the look-up table would have 2,048 entries. Each entry in the table would be represented by 2 bytes, so the look-up table would require 4 KB of memory.

FIG. 10A shows an example of converting an integer to a character string in accordance with the flowcharts of FIGS. 8 and 9. Each calculation will be described with reference to the steps of the flowcharts of FIGS. 8 and 9. The initial value of 41.625 is the value to be converted. At "Calculate Upper and Lower Adjacent Floating Point Values" step 810, the values shown in table 10A-1 Lower and Upper columns are calculated. Control then proceeds to "Convert Upper and Lower to Integers" step 820, which are represented by IUpper and ILower columns of the first row in Table 10A-2. At this point, steps 410 through 460 of the flowchart of FIG. 4 can be used to convert Upper and Lower to integers. Control then proceeds to "Calculate Mid-points" step 830, and the results are shown in the IMidLower and IMidUpper columns of the second row of Table 10A-2. As described above, the IMidUpper mid-point between IUpper and IValue is calculated as (IUpper−IValue)/2+IValue. The value of IValue is added to avoid potential overflow. The IMidLower mid-point between ILower and IValue is calculated as (IValue−ILower)/2+ILower.

From "Calculate Mid-points" step 830, control proceeds to "'Round' Integer" step 840. This step is represented by Table 10A-3. The first row corresponds to "Divisor=Initial Value (e.g., 10,000)" step 910, where the Divisor variable is set to 10,000. Control proceeds to "Divisor=1" decision point 920, where a determination is made whether the divisor now has a value of 1. Having just assigned a value of 10,000 to the divisor, the result of the determination at "Divisor=1" decision point 920 is 'no,' and control proceeds to "IMod=IValue Modulus Divisor" step 930. As shown in the second row of Table 10A-3, IMod is assigned the result of IValue Modulus Divisor (in this case 0). In this row, the modulus function divides the number 41625000000000000 by the divisor 10,000 and returns the remainder 0 from the division operation.

From "IMod=IValue Modulus Divisor" step 930, control proceeds to "IValue+(Divisor−IMod)<IMidUpper" step 940. "IValue+(Divisor−IMod)<IMidUpper" step 940 determines whether the difference between IValue and (Divisor−IMod) is less than the variable IMidUpper, which would indicate IValue can be "rounded" up. At "IValue+(Divisor−IMod) <IMidUpper" step 940, the difference between IValue and (Divisor−IMod) is not less than the variable IMidUpper, so control proceeds to "IValue−IMod>IMidLower" step 970. "IValue−IMod>IMidLower" step 970 indicates that IValue− IMod is greater than the value of IMidLower, so that IValue can be "rounded" down. In this example, IValue−IMod is greater than the value of IMidLower, so control proceeds to "IValue=IValue−IMod" step 960, where IValue is decreased by the amount of IMod (which is zero in this case). Control then proceeds to "Return Rounded Integer IValue for Conversion to Character String" step 990. The value returned is the value of IValue, 41625000000000000. However, because the last twelve characters are trailing zeroes, those characters will be trimmed in "Trim Trailing Zeroes from Character String" step 490 of FIG. 4. Therefore, the shortest character string will actually be 41625.

FIG. 10B shows another example of converting an integer to a character string in accordance with the flowcharts of FIGS. 8 and 9. The initial value of 0.1499999999999999944 is the value to be converted. At "Calculate Upper and Lower Adjacent Floating Point Values" step 810, the values shown in table 10B-1 Lower and Upper columns are calculated. Control then proceeds to "Convert Upper and Lower to Integers" step 820, which are represented by IUpper and ILower columns of the first row in Table 10B-2. At this point, steps 410 through 460 of the flowchart of FIG. 4 can be used to convert Upper and Lower to integers. Control then proceeds to "Calculate Mid-points" step 830, and the results are shown in the IMidLower and IMidUpper columns of the second row of Table 10B-2. As described above, the IMidUpper mid-point between IUpper and IValue is calculated as (IUpper−IValue)/ 2+IValue. The value of IValue is added to avoid potential overflow. The IMidLower mid-point between ILower and IValue is calculated as (IValue−ILower)/2+ILower.

From "Calculate Mid-points" step 830, control proceeds to "'Round' Integer" step 840. This step is represented by Table 10B-3. The first row corresponds to "Divisor=Initial Value (e.g., 10,000)" step 910, where the Divisor variable is set to 10,000. Control proceeds to "Divisor=1" decision point 920, where a determination is made whether the divisor now has a value of 1. Having just assigned a value of 10,000 to the divisor, the result of the determination at "Divisor=1" decision point 920 is 'no,' and control proceeds to "IMod=IValue Modulus Divisor" step 930. As shown in the second row of Table 10A-3, IMod is assigned the result of IValue Modulus Divisor (in this case 9,944). In this row, the modulus function divides the number 1499999999999999944 by the divisor 10,000 and returns the remainder 9,944 from the division operation.

From "IMod=IValue Modulus Divisor" step 930, control proceeds to "IValue+(Divisor−IMod)<IMidUpper" step 940. "IValue+(Divisor−IMod)<IMidUpper" step 940 determines whether the difference between IValue and (Divisor−IMod) is less than the variable IMidUpper, which would indicate IValue can be "rounded" up. In this example, the difference between IValue and (Divisor−IMod) is less than the variable IMidUpper, so control proceeds to "IValue=IValue+(Divisor−IMod)" step 950. At "IValue=IValue+(Divisor−IMod)" step 950, IValue is "rounded" by incrementing IValue by (Divisor−IMod), producing a value of 1500000000000000000. Control then proceeds to "Return Rounded Integer IValue for Conversion to Character String" step 990. Processing of "'Round' Integer" step 840 of FIG. 8 is then complete, and control returns to "Convert Rounded Integer to Character String" step 850, where the rounded value of IValue is converted to a character string. At that point, processing of "Convert Integer to Character String" step 470 of FIG. 4 is completed, and control returns to "Adjust Base 10 Exponent" step 480 of FIG. 4. The character string will be trimmed to 15 when the trailing zeroes are trimmed in "Trim Trailing Zeroes from Character String" step 490 of FIG. 4.

FIG. 10C shows another example of converting an integer to a character string in accordance with the flowcharts of FIGS. 8 and 9. The initial value of 1.02099847614441939e− 130 is the value to be converted. At "Calculate Upper and Lower Adjacent Floating Point Values" step 810, the values shown in table 10C-1 Lower and Upper columns are calculated. Control then proceeds to "Convert Upper and Lower to Integers" step 820, which are represented by IUpper and ILower columns of the first row in Table 10C-2. At this point, steps 410 through 460 of the flowchart of FIG. 4 can be used to convert Upper and Lower to integers. Control then proceeds to "Calculate Mid-points" step 830, and the results are shown in the IMidLower and IMidUpper columns of the second row of Table 10C-2. As described above, the IMidUpper mid-point between IUpper and IValue is calculated as (IUpper−IValue)/2+IValue. The value of IValue is added to avoid potential overflow. The IMidLower mid-point between ILower and IValue is calculated as (IValue−ILower)/2+ILower.

From "Calculate Mid-points" step 830, control proceeds to "'Round' Integer" step 840. This step is represented by Table 10C-3. The first row corresponds to "Divisor=Initial Value (e.g., 10,000)" step 910, where the Divisor variable is set to 10,000. Control proceeds to "Divisor=1" decision point 920, where a determination is made whether the divisor now has a value of 1. Having just assigned a value of 10,000 to the divisor, the result of the determination at "Divisor=1" decision point 920 is 'no,' and control proceeds to "IMod=IValue Modulus Divisor" step 930. As shown in the second row of Table 10C-3, IMod is assigned the modulus Divisor of IValue (in this case 1,939). In this row, the modulus function divides the number 1.02099847614441939e-130 by the divisor 10,000 and returns the remainder 1,939 from the division operation.

From "IMod=IValue Modulus Divisor" step 930, control proceeds to "IValue+(Divisor−IMod)<IMidUpper" step 940. "IValue+(Divisor−IMod)<IMidUpper" step 940 determines whether the difference between IValue and (Divisor−IMod) is less than the variable IMidUpper, which would indicate IValue can be "rounded" up. In this example, the difference between IValue and (Divisor−IMod) is not less than the variable IMidUpper, so control proceeds to "IValue−IMod>IMidLower" step 970. At "IValue−IMod>IMidLower" step 970, IValue−IMod is not greater than the value of IMidLower, so control proceeds to "Divisor=Divisor/10" step 980, where the divisor is divided by 10. Control then returns to "Divisor=1" decision point 920, where a determination is made whether the divisor has reached a value of 1. At this point, the divisor has a value of 1000, as shown in the third row of Table 10C-3.

The fourth through the eighth rows of Table 10C-3 show that rounding is not possible and the divisor is reduced in multiple iterations of "Divisor=Divisor/10" step 980. At the eighth row, the difference between IValue and (Divisor−IMod) is less than the variable IMidUpper, so control proceeds to "IValue=IValue+(Divisor−IMod)" step 950. At "IValue=IValue+(Divisor−IMod)" step 950, IValue is "rounded" by incrementing IValue by (Divisor−IMod), producing a value of 102099847614441940. Control then proceeds to "Return Rounded Integer IValue for Conversion to Character String" step 990. Processing of "'Round' Integer" step 840 of FIG. 8 is then complete, and control returns to "Convert Rounded Integer to Character String" step 850, where the rounded value of IValue is converted to a character string. At that point, processing of "Convert Integer to Character String" step 470 of FIG. 4 is completed, and control returns to "Adjust Base 10 Exponent" step 480 of FIG. 4. The character string will be trimmed to 10209984761444194 when the trailing zeroes are trimmed in "Trim Trailing Zeroes from Character String" step 490 of FIG. 4.

The present invention has many advantages. By significantly reducing the number of multiplication operations in converting a real number from a floating point representation to a character string, the conversion can be performed more quickly, thereby increasing the speed of conversion. The process can be used by web servers, increasing the throughput of web servers, as well as by other software performing conversion of real numbers to character strings. The shortest possible character string that accurately represents the value can be produced, thereby making reports and screen displays easier to read and improving customer satisfaction.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
 causing a processor of a web server to retrieve a floating-point value from a memory, wherein
  the processor and the memory are communicatively coupled to one another, and
  the floating-point value is stored in the memory in a floating-point format;
 causing the processor to convert the floating-point value into a character string, comprising
  causing the processor to extract mantissa bits from the floating-point value, wherein the mantissa bits are bits of a mantissa of the floating-point value, causing the processor to store the mantissa bits in a first integer variable, wherein the first integer variable is in an integer format, causing the processor to produce a result by shifting the mantissa bits in the first integer variable by a number of positions, causing the processor to store the result in a second integer variable, wherein the second integer variable is in the integer format, and causing the processor to convert the first integer variable to the character string, wherein the causing the processor to convert the first integer variable to the character string comprises causing the processor to convert the second integer to the character string; and causing the processor to produce a web page, wherein the web page comprises the character string.

2. The method of claim 1, wherein the number of positions by which the mantissa bits are shifted is equal to a base 2 exponent of the floating-point value, and the mantissa bits are shifted left.

3. The method of claim 1, further comprising:

prior to the causing the processor to convert the floating-point value, causing the processor to adjust the floating-point value by causing the processor to divide the floating-point value by $2^n$, where the n is a number of bits in the mantissa bits, and causing the processor to convert the floating-point value to a number greater than or equal to 1.0 and less than 10.0, after the floating-point value has been divided by the $2^n$.

4. The method of claim 3, wherein the causing the processor to convert the result of the dividing comprises causing the processor to perform a set of operations.

the set of operations comprises a lookup operation and a multiplication operation, the lookup operation causes the processor to retrieve a constant from a lookup table, the lookup table is stored in the memory, and the multiplication operation causes the processor to multiply the floating-point value by the constant.

5. The method of claim 4, wherein the lookup table further comprises a value of a base 10 exponent for a result of the multiplication operation.

6. The method of claim 3, wherein the causing the processor to convert the result of the dividing comprises causing the processor to perform a set of operations, the set of operations is a set of multiplication operations, and the set of multiplication operations comprises no more than a maximum number of multiplication operations.

7. The method of claim 6, wherein if a number of bits in an exponent of the floating-point value is 11, the maximum number of multiplication operations is 9.

8. The method of claim 7, further comprising:

for each multiplication operation in the set of multiplication operations, causing the processor to add a corresponding value to a variable, wherein the variable is used to calculate a base 10 exponent to be appended to the character string.

9. A computer program product comprising:

a plurality of instructions, comprising a first set of instructions, executable on a computer system, configured to cause a processor to retrieve a floating-point value from a memory, wherein the computer system is a web server, the computer system comprises the processor and the memory, the processor and the memory are communicatively coupled to one another, and the floating-point value is stored in the memory in a floating-point format, a second set of instructions, executable on the computer system, configured to convert the floating-point value into a character string, wherein the second set of instructions comprises a first subset of instructions, executable on the computer system, configured to extract mantissa bits from the floating-point value, wherein the mantissa bits are bits of a mantissa of the floating-point value, a second subset of instructions, executable on the computer system, configured to store the mantissa bits in a first integer variable, wherein the first integer variable is in an integer format, a third subset of instructions, executable on the computer system, configured to produce a result by shifting the mantissa bits in the first integer variable by a number of positions, a fourth subset of instructions, executable on the computer system, configured to store the result in a second integer variable, wherein the second integer variable is in the integer format, and a fifth subset of instructions, executable on the computer system, configured to convert the first integer variable to the character string, wherein the fifth subset of instructions comprise a first sub-subset of instructions, executable on the computer system, configured to convert the second integer to the character string, and a third set of instructions, executable on said computer system, configured to produce a web page, wherein the web page comprises the character string; and a computer readable storage medium, wherein the instructions are encoded in the computer readable storage medium.

10. The computer program product of claim 9, wherein the second set of instructions further comprises:

a sixth subset of instructions, executable on the computer system, configured to divide the floating-point value by $2^n$, where the n is a number of the mantissa bits in the floating-point value; and a seventh subset of instructions, executable on the computer system, configured to perform a set of operations to convert a result of the dividing to a number greater than or equal to 1.0 and less than 10.0.

11. The computer program product of claim 10, wherein the set of operations comprises a lookup operation and a multiplication operation, the lookup operation causes the processor to retrieve a constant from a lookup table, and the multiplication operation causes the processor to multiply the floating-point value by the constant.

12. The computer program product of claim 11, wherein the lookup table further comprises a value of a base 10 exponent for a result of the multiplication operation.

13. The computer program product of claim 10, wherein the set of operations is a set of multiplication operations, and the set of multiplication operations comprises no more than a maximum number of multiplication operations.

14. The computer program product of claim 13, wherein the second set of instructions further comprises:

an eighth subset of instructions, executable on the computer system, configured to add a corresponding value to a variable for each multiplication operation in the set of multiplication operations, wherein the variable is used to calculate a base 10 exponent to be appended to the character string.

* * * * *

UNITED STATES PATENT AND TRADEMARK OFFICE
CERTIFICATE OF CORRECTION

PATENT NO.         : 7,685,213 B2                                Page 1 of 1
APPLICATION NO.    : 11/103996
DATED              : March 23, 2010
INVENTOR(S)        : Nathan Luther Reynolds It is certified that error appears in the above-identified patent and that said Letters Patent is hereby corrected as shown below:

In column 15, line 35, delete "Value." and insert -- IValue. --, therefor.

In column 15, line 37, delete "(UValue" and insert -- (IValue --, therefor.

In column 16, line 3, delete "Ivalue" and insert -- IValue --, therefor.

In column 21, line 40, in Claim 4, delete "operations." and insert -- operations, --, therefor.

Signed and Sealed this
First Day of March, 2011

David J. Kappos
*Director of the United States Patent and Trademark Office*